(12) United States Patent
Ikeda et al.

(10) Patent No.: US 11,104,381 B2
(45) Date of Patent: Aug. 31, 2021

(54) VEHICLE STRUCTURE

(71) Applicant: Toyota Jidosha Kabushiki Kaisha, Toyota (JP)

(72) Inventors: Yozo Ikeda, Toyota (JP); Satoru Nagaya, Toyota (JP); Yoshimi Toda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/907,761

(22) Filed: Jun. 22, 2020

(65) Prior Publication Data
US 2020/0406974 A1 Dec. 31, 2020

(30) Foreign Application Priority Data
Jun. 28, 2019 (JP) .............................. JP2019-121699

(51) Int. Cl.
| | |
|---|---|
| *B62D 21/03* | (2006.01) |
| *B62D 21/09* | (2006.01) |
| *B62D 25/02* | (2006.01) |
| *B60P 1/43* | (2006.01) |
| *B60K 1/04* | (2019.01) |
| *B62D 47/02* | (2006.01) |
| *B62D 25/20* | (2006.01) |

(52) U.S. Cl.
CPC ................ *B62D 21/03* (2013.01); *B60K 1/04* (2013.01); *B60P 1/431* (2013.01); *B62D 21/09* (2013.01); *B62D 25/025* (2013.01); *B62D 25/2036* (2013.01); *B62D 47/02* (2013.01); *B60K 2001/0438* (2013.01)

(58) Field of Classification Search
CPC .. B60K 1/04; B60K 2001/0438; B62D 21/03; B62D 21/09
USPC ................ 296/209, 35.1; 280/791, 784, 790, 280/795–798, 107
See application file for complete search history.

(56) References Cited

U.S. PATENT DOCUMENTS

| | | | |
|---|---|---|---|
| 7,334,958 B2* | 2/2008 | Muller | F16B 5/04 403/168 |
| 8,002,064 B2* | 8/2011 | Yamada | B62D 21/02 180/89.12 |
| 8,042,862 B2* | 10/2011 | Cox | B62D 25/087 296/204 |
| 8,366,150 B2* | 2/2013 | Parsons | B62D 21/09 280/797 |

(Continued)

FOREIGN PATENT DOCUMENTS

JP     H11115798 A    4/1999

*Primary Examiner* — Dennis H Pedder
(74) *Attorney, Agent, or Firm* — Dinsmore & Shohl LLP (57) ABSTRACT

On both sides under a floor of an electric vehicle, side members are provided, each in a closed cross sectional shape. Collars and the like are provided in the side members. On a lower side of a lower wall of each of the side members, cross members which are fixed by using the collars or the like are provided. Between the side members on both sides, a main battery is provided and supported by the cross members. In the vicinity of a lower side of a doorway of the electric vehicle, a cutout part is formed such that a height of a portion of an upper wall of the side member is relatively lowered. On an upper surface of the cutout part, a reinforcing member is provided. A ramp passes through a space on an upper side of the cutout part.

2 Claims, 5 Drawing Sheets

(56) References Cited

U.S. PATENT DOCUMENTS 9,926,017 B1 * 3/2018 Hamilton ............... B62D 27/02
10,688,854 B2 * 6/2020 Caliskan ................. B60K 1/04

* cited by examiner

VEHICLE STRUCTURE

CROSS REFERENCE TO RELATED APPLICATION

This application claims priority to Japanese Patent Application No. 2019-121699 filed on Jun. 28, 2019, which is incorporated herein by reference in its entirety including the specification, claims, drawings, and abstract.

TECHNICAL FIELD

The present disclosure relates to a vehicle structure of a vehicle, which includes a movable ramp for getting in/out.

BACKGROUND

There are vehicles that have a ramp for getting in/out.

In JP 1999-115798 A, it is described that in a vehicle including a frame structure of a bus, a truck, or the like, a floor thereof is made lower and a movable ramp is provided under a floor surface. It is described therein that in order to move the ramp from under the floor, a cutout part is provided for a side member of the frame. In addition, inside the side member, a reinforcing member is provided adjacently to the side member of the frame.

SUMMARY

When in the electric vehicle including the frame structure, a battery is mounted inside the frame, it is impossible to dispose the reinforcing member, though it is possible in JP 1999-115798 A.

It is an objective of the present disclosure to install a movable ramp for getting in/out in an electric vehicle having a frame structure.

A vehicle structure according to the present disclosure includes: side members being provided on both sides under a floor of an electric vehicle, each of the side members being in a closed cross sectional shape; collars being provided in such a way as to be laid across an upper wall and a lower wall of each of the side members; cross members being fixed on a lower side of the lower wall of each of the side members by using the collars and being laid across the side members on both sides; a main battery being provided between the side members on both sides and being supported by the cross members; in a vicinity of a lower side of a doorway of the electric vehicle, a cutout part being formed such that a height of a portion of the upper wall of the side member is relatively lowered; a reinforcing member being provided on an upper surface of the cutout part; and a ramp passing through a space on an upper side of the cutout part and moving to an outside of the vehicle upon being installed and moving to an upper side of the main battery upon being housed.

In one aspect of the vehicle structure according to the present disclosure, lower ends of the collars are joined onto an upper surface of the lower wall of each of the side members by welding.

In another aspect of the vehicle structure according to the present disclosure, on an outer surface of a side wall of each of the side members on an outer side in a vehicle width direction, a plurality of cab mount brackets for supporting an upper body of the electric vehicle are attached, and in a vicinity of the cutout part, an attachment density of the cab mount brackets is increased.

According to the present disclosure, it is made possible to install a ramp in an electric vehicle including a frame structure.

BRIEF DESCRIPTION OF DRAWINGS

An embodiment of the present disclosure will be described based on the following figures, wherein.

DESCRIPTION OF EMBODIMENT

Hereinafter, with reference to the accompanying drawings, an embodiment will be described. In the description, in order to facilitate understanding, a specific illustrative embodiment will be described. However, this illustrates the embodiment as an example, and other various embodiments can be devised.

Figure 1:
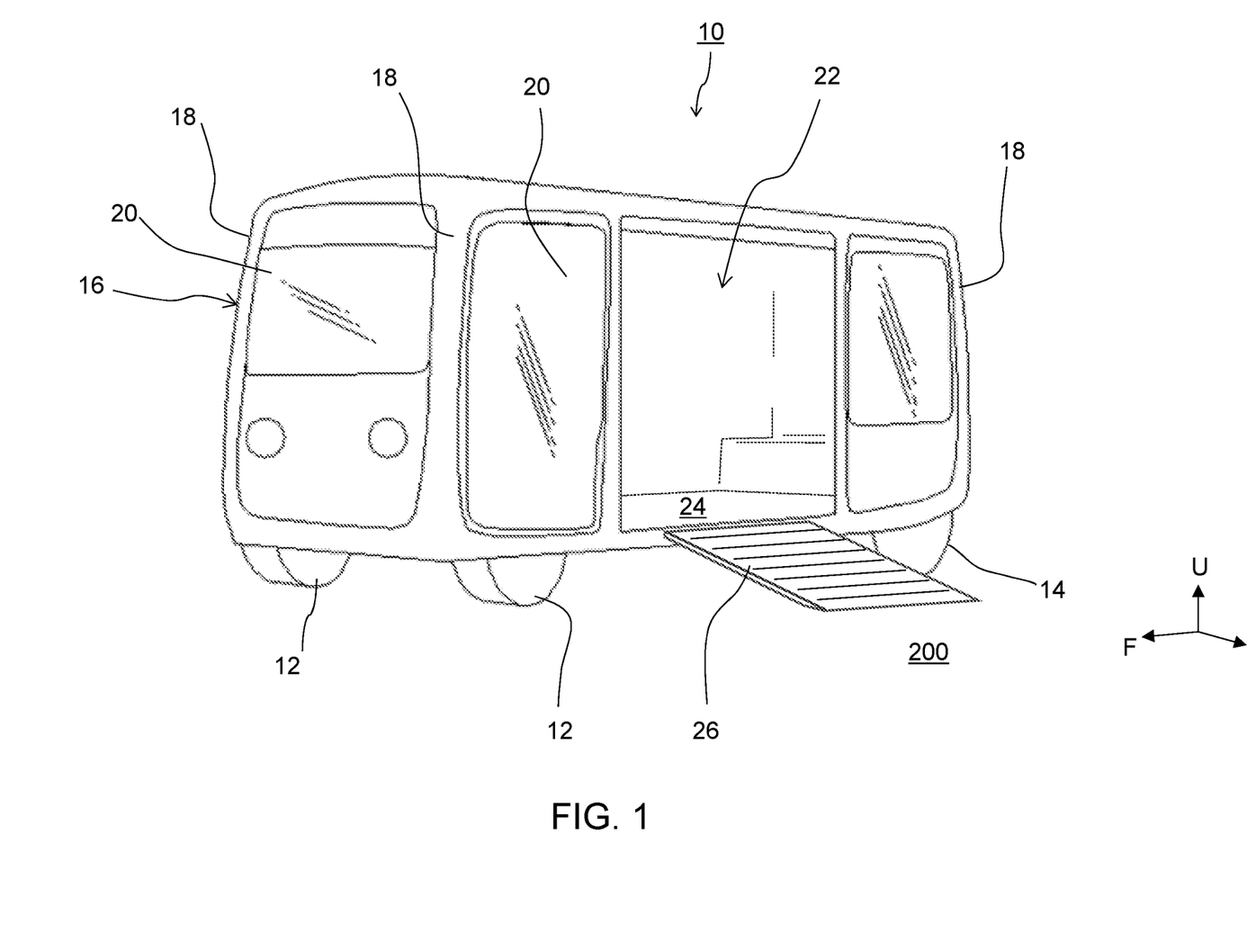
FIG. 1 is a diagram showing schematic appearance of a vehicle according to an embodiment.

FIG. 1 is an appearance diagram of a vehicle 10 according to the embodiment. In a coordinate system in FIG. 1, an F axis indicates a vehicle front direction, a U axis indicates an upward direction, and an L axis indicates a direction of a left hand of a vehicle occupant who views a front direction (these directions are the same in the drawings below).

The vehicle 10 is a four-wheeled vehicle which is provided with a pair of front wheels 12 and a pair of rear wheels 14. A body 16 is formed in a substantially rectangular parallelepiped shape in a front/rear symmetric manner. The body 16 is provided with pillars 18 in four corners thereof in plan view, which extend in a vertical direction. Translucent panels 20 constitute large parts of front, rear, left, and right side surface walls of the vehicle 10.

A central portion of a left side surface of the vehicle 10 is a doorway 22 thereof. The doorway 22 includes a slide-type door. In FIG. 1, the door has slid and is opened, and in this state, passengers can get in and out. On the inside of the vehicle which can be seen from the doorway 22, a floor 24 is illustrated. Besides the floor 24, although seats and the like for the passengers are installed in an inside of the vehicle, the illustration therefor is omitted.

In a lower portion of the doorway 22, a ramp 26 is installed. The ramp 26 is a thin rectangular part which smoothly connects the floor 24 of the vehicle 10 and the ground 200. The ramp 26 is made to be movable by a movement mechanism including a motor, not shown, and moves by automatic control of the vehicle 10 or by an operation performed by an operator aboard the vehicle 10. The ramp 26 is installed in such a way as to be housed under the floor 24 during traveling and move to an outside of the vehicle from under the floor 24 at the time of occupants getting in/out such that an end portion of the ramp 26 is placed on the ground 200. In FIG. 1, it is assumed that a height of the ground 200 is the same as a height of a roadway on which the vehicle 10 travels, and the ramp 26 is installed downward, viewed from the floor 24. However, the ramp 26 is capable of adjusting an angle in accordance with the height of the ground 200 with the movement mechanism. Therefore, the ground 200 may be, for example, a sidewalk which is formed to be higher than the roadway, a platform which is installed a position higher than the floor 24 inside the vehicle, or the like.

The ramp 26 is installed, thereby facilitating passenger utilizing a wheelchair getting in/out with the passenger seated on the wheelchair. In addition, the ramp 26 is also useful when an elderly passenger, a physically handicapped passenger, and the like gets in/out by walking.

It is assumed that the vehicle 10 is a vehicle which can be automatically driven. Specifically, the vehicle 10 can be driven in a plurality of driving modes which include an automatic driving mode and a manual driving mode. The automatic driving mode is a driving mode in which driving control is mainly performed by a computer. In the present description, in the concept of the driving control, shift change control, vehicle speed control, or steering control are embraced. In addition, in the concept of the vehicle speed control, start control, stop control, and acceleration and deceleration control of the vehicle 10 are embraced. In the automatic driving mode, results detected by a variety of sensors (for example, a camera, a lidar, and the like) provided for the vehicle 10 are utilized, whereby the computer of the vehicle 10 performs the driving control. In the automatic driving mode, for example, control related to the the passengers getting in/out can also be automatically performed. Specifically, as examples, opening and closing of the doorway 22, installation and housing of the ramp 26, and the like are cited. Note that also in the case of the automatic driving mode, an operator may get in the vehicle and issue, for example, a start instruction from a stop state, a control instruction related to the passengers getting in/out, and the like. In addition, instead of the operator, a management center which is present in a remote location may issue the start instruction, the control instruction related to passengers getting in/out, and the like.

The manual driving mode is a mode in which the vehicle 10 does not perform the automatic driving and the operator aboard the vehicle 10 performs the driving control of the vehicle 10. In the manual driving mode, normally, the control related to the passengers getting in/out is also performed by the operator.

Note that the operator refers to a person who is aboard the vehicle 10 and is involved in the control of the vehicle 10. In the automatic driving mode, since the management center or the vehicle 10 itself mainly performs the driving control, the operator has few chances to perform the driving control. However, the operator is involved in the start control from the stop state, and it can be said that the operator is involved in the control of the vehicle 10. In the manual driving mode, the operator serves as a driver who directly performs a driving operation of the vehicle 10, and it can be said that the operator is involved in the control of the vehicle 10.

The vehicle 10 is an omnibus-type vehicle which an unspecified large number of passengers get on together. In the present embodiment, the vehicle 10 is utilized as a bus which transports passengers to a prescribed site while traveling along a specified route. Accordingly, it is assumed that the vehicle 10 repeats stopping and starting at a comparatively high frequency. In addition, it is assumed that the vehicle 10 travels at a comparatively low speed (for example, 30 km/h or less).

However, a form in which the vehicle 10 disclosed in the present description is utilized can be appropriately changed, and for example, the vehicle 10 may be utilized as a movable business space or as a store such as a retailer in which a variety of commercial goods are displayed and sold, and a restaurant in which food and drink are cooked and served. In addition, as another form, the vehicle 10 may also be used as an office for conducting office work, a meeting with customers, and the like. Furthermore, utilization scenes of the vehicle 10 are not limited to scenes of the business and for example, the vehicle 10 may be used as a private moving transportation. Moreover, a traveling pattern and a vehicle speed of the vehicle 10 may be appropriately changed.

The vehicle 10 is an electric vehicle having a driving motor which receives power supply from a battery, as a prime mover. The battery is a secondary battery which is rechargeable and dischargeable and is periodically recharged from external power. As the electric vehicle, a hybrid vehicle on which an engine and a driving motor as a prime mover are mounted is also included. In addition, as the electric vehicle, a hydrogen vehicle which drives a driving motor by electric power generated by a fuel cell is also included.

Figure 2:
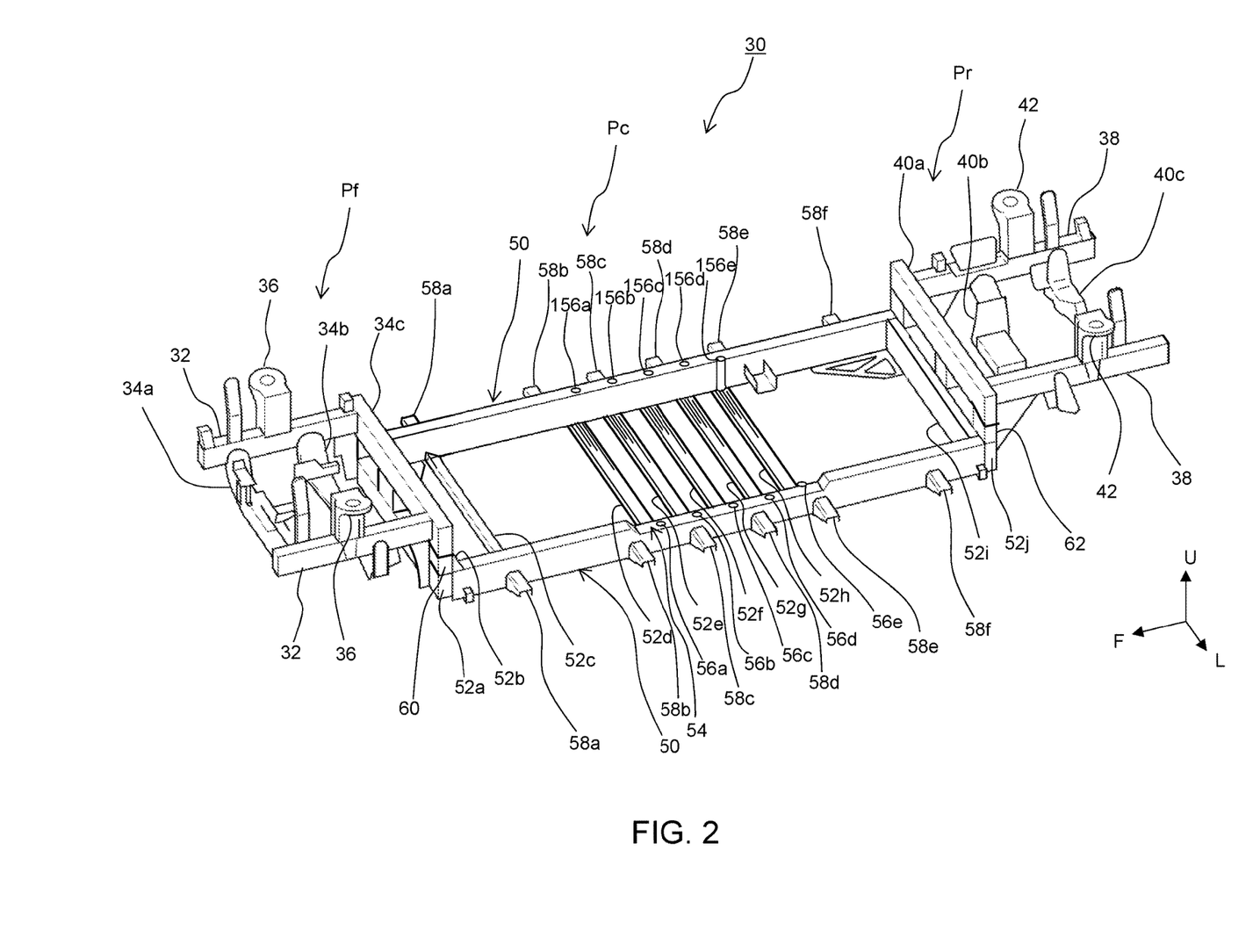
FIG. 2 is a diagram showing a frame structure of the vehicle.

FIG. 2 is a perspective view showing a frame 30 of the vehicle 10. In the vehicle 10, the frame 30 is of a body-on-frame structure in which a box-shaped upper body is assembled on the frame 30.

The frame 30 is roughly divided into a front part Pf which is located on a side of the front wheels 12, a rear part Pr which is located on a side of the rear wheels 14, and a center part Pc which is located between the front part Pf and the rear part Pr. The front part Pf is provided with a pair of front side members 32 which are located on both sides (a left side and a right side) and extend in a vehicle front-rear direction and three front cross members 34a, 34b, and 34c which connect both the front side members 32. Among these, the front cross member 34c connects rear ends of the two front side members 32 to each other. On upper surfaces of the front side members 32, suspension towers 36 for attaching air suspensions (not shown) are respectively provided.

As with the front part Pf, the rear part Pr is provided with a pair of rear side members 38 which extend in the vehicle front-rear direction and three rear cross members 40a, 40b, and 40c which connect both the rear side members 38. Among these, the rear cross member 40a connects front ends of the two rear side members 38 to each other. On upper surfaces of the rear side members 38, suspension towers 42 for attaching air suspensions (not shown) are respectively provided.

The center part Pc is provided with center side members 50 which are respectively located on both sides thereof and extend in the vehicle front-rear direction. In addition, between both the center side members 50, ten center cross members 52a, 52b, 52c, 52d, 52e, 52f, 52g, 52h, 52i, and 52j are laid across in order from a front side thereof.

The center cross member 52a connects front ends of the pair of center side members 50 to each other. The center cross member 52b is provided behind the center cross member 52a in such a way as to be adjacent to the cross member 52a and reinforces the center cross member 52a, thereby preventing distortion of the center part Pc. Similarly, the center cross member 52j connects rear ends of the pair of center side members 50 to each other. The center cross member 52i is provided ahead of the center cross member 52j in such a way as to be adjacent to the center cross member 52j and reinforces the center cross member 52j, thereby preventing the distortion of the center part Pc. The center cross members 52c, 52d, 52e, 52f, 52g, and 52h are respectively connected to lower surfaces of the center side members 50 in middle portions of the center side members 50. Among these, the center cross member 52c is located in a front portion of the center part Pc and supports a lower surface of a front end of a main battery 70 (see FIG. 3). In addition, the center cross members 52d, 52e, 52f, 52g, and 52h are located in the vicinity of a central portion of the center part Pc, support a rear portion of the main battery 70, and as described later, reinforce the ramp 26 and the movement mechanism and a housing structure of the ramp 26.

The center side member 50 on a right side is formed to have a uniform height. However, in a central portion of the center side member 50 on a left side, a cutout part 54 having a cutout shape whose upper surface is formed to be lower than a surface of the periphery thereof is formed. The cutout part 54 is located on a lower side of the doorway 22 of the vehicle 10. A space on an upper side of the cutout part 54 provided below the floor 24 is used to move the ramp 26.

In a portion of the center side member 50 on the left side, where the cutout part 54 is formed, five collars 56a, 56b, 56c, 56d, and 56e are provided at substantially equal intervals in order from the front. As with the above-mentioned five collars, the center side member 50 on the right side is provided with five collars 156a, 156b, 156c, 156d, and 156e corresponding thereto. Since the collars 156a, 156b, 156c, 156d, and 156e on the right side are provided in the portion where no cutout part 54 is formed, a length of each collar in a vertical direction is long. A pair of left and right collars 56a and 156a, a pair of left and right collars 56b and 156b, a pair of left and right collars 56c and 156c, a pair of left and right collars 56d and 156d, and a pair of left and right collars 56e and 156e are used to fix the center cross members 52d, 52e, 52f, 52g, and 52h on lower surfaces of the center side members 50, respectively. In addition, the collars 56a, 56b, 56c, 56d, and 56e provided for the center side member 50 on the left side enhance a strength of the center side member 50 on the left side in the vicinity of the cutout part 54. The collars 156a, 156b, 156c, 156d, and 156e provided for the center side member 50 on the right side enhance a strength of the center side member 50 on the right side in the vicinity corresponding to the cutout part 54.

On an outer surface of a side wall of each of the center side members 50 on both sides on an outer side in a vehicle width direction, six cab mount brackets 58a, 58b, 58c, 58d, 58e, and 58f are provided in order from the front. The cab mount brackets 58a, 58b, 58c, 58d, 58e, and 58f are members for supporting the upper body assembled on an upper side thereof. An interval between the cab mount bracket 58a located foremost and the cab mount bracket 58b adjacent thereto is wide, and an interval between the cab mount bracket 58f located last and the cab mount bracket 58e adjacent thereto is also similarly wide. An interval between the cab mount brackets 58b and 58c, an interval between the cab mount brackets 58c and 58d, and an interval between the cab mount brackets 58d and 58e are narrow. This is because in the vicinity of the cutout part 54, an attachment density of the cab mount brackets 58b, 58c, 58d, and 58e is increased. The cab mount brackets 58a, 58b, 58c, 58d, 58e, and 58f are joined to the upper body and are integrated with the upper body, thereby enhancing stiffness of the center side members 50. The cab mount brackets 58a, 58b, 58c, 58d, 58e, and 58f densely provided for the center side member 50 on the left side enhance a strength of the center side member 50 on the left side in the vicinity of the cutout part 54. In addition, the cab mount brackets 58a, 58b, 58c, 58d, 58e, and 58f densely provided for the center side member 50 on the right side enhance a strength of the center side member 50 on the right side in the vicinity to the cutout part 54.

The center part Pc is a portion corresponding to a lower portion of the floor 24 and is located lower than the front part Pf and the rear part Pr. Between the center part Pc and the front part Pf, a kick member 60 extending vertically is provided and connects the front cross member 34c and the center cross member 52a. In addition, between the center part Pc and the rear part Pr, a kick member 62 extending vertically is provided and connects the rear cross member 40a and the center cross member 52j.

Figure 3:
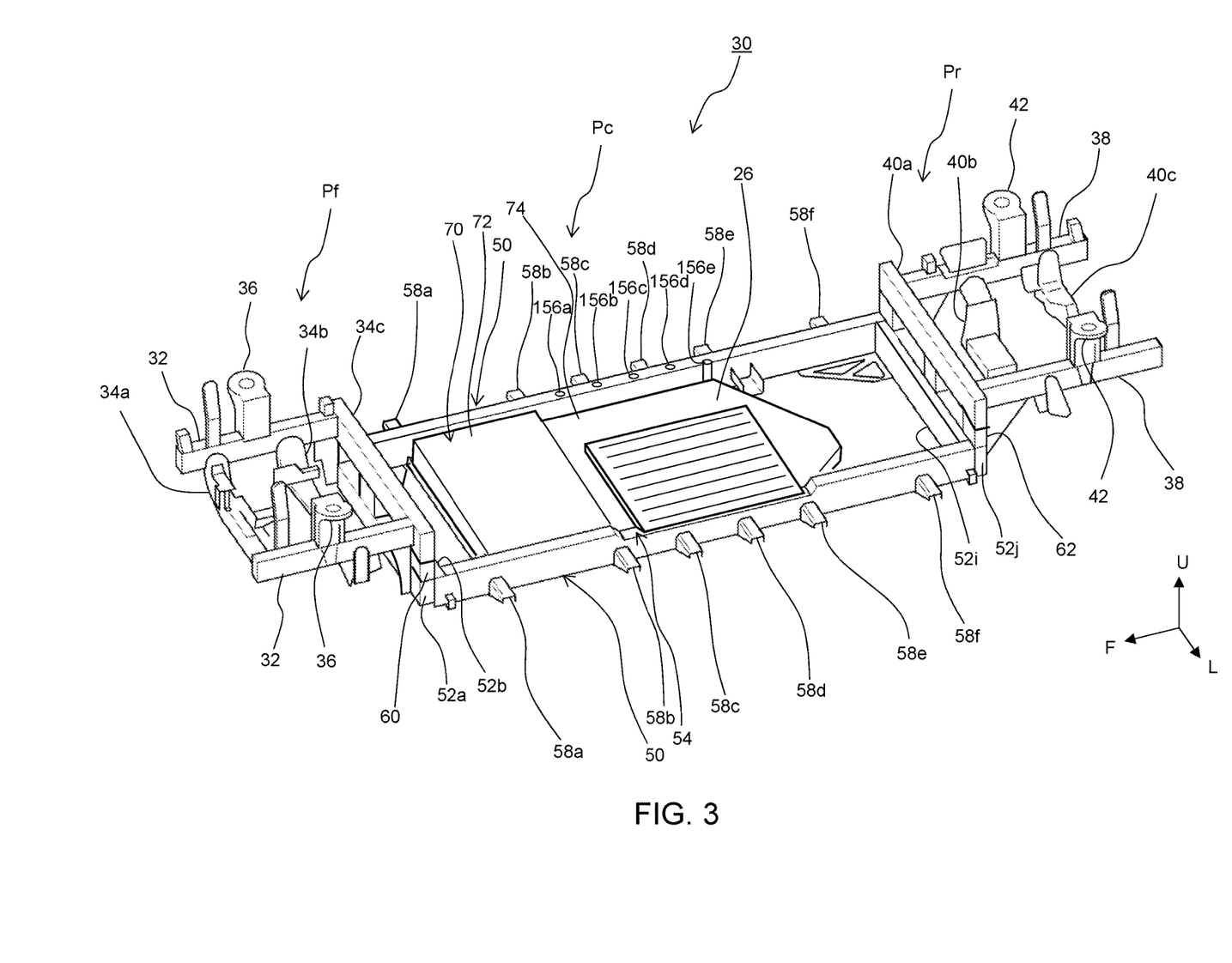
FIG. 3 is a diagram in which a main battery and a ramp are disposed in the frame structure shown in FIG. 2.

Here, with reference to FIG. 3, the description as to the center part Pc will be continued. FIG. 3 shows a state in which in the frame 30 shown in FIG. 2, the main battery 70, and the ramp 26 are housed inside the center part Pc.

As shown in FIG. 3, the main battery 70 is installed in the vicinity of a central portion of the center part Pc. The main battery 70 is a battery which supplies power to a driving battery of the electric vehicle. Since, in the electric vehicle, it is required to supply large power to the driving motor over a long period of time, the main battery 70 is constituted of a multitude of battery cells (or a battery module in which battery cells are collected) and is large in terms of a volume. A lower surface of the main battery 70 is substantially flat, a lower surface of a front end thereof is supported by the center cross member 52c, and a rear end side thereof is supported by the center cross members 52d, 52e, 52f, 52g, and 52h.

An upper surface of the main battery 70 is in a stepwise shape having two steps, and a high step part 72 on a front side, whose upper surface is high and a low step part 74 on a rear side, whose upper surface is low are formed. Inside the high step part 72, a comparatively large number of battery cells are housed, and a height of the upper surface thereof is slightly lower than that of an upper surface of each of the center side members 50. Inside the low step part 74, a comparatively small number of battery cells are housed, and a height of the upper surface thereof is at a substantially middle position between the upper surface and a lower surface of each of the center side members 50. The height of the upper surface of the low step part 74 is set so as to allow the ramp 26 to be housed and moved, and is set to be slightly lower than that of the upper surface of the cutout part 54.

As shown in FIG. 3, the ramp 26 is housed so as to be movable to an upper side of the main battery 70. In FIG. 3, only the ramp 26 which has been housed is shown, and the movement mechanism such as a motor used for movement, the housing structure for holding the ramp 26 on the upper side of the main battery 70, and the like, are omitted.

An upper surface of the ramp 26 is located at a position slightly lower than a general upper surface (that is, an upper surface of a portion excluding the cutout part 54) of each of the center side members 50. Therefore, the ramp 26 can be moved and housed without interfering with the floor 24 and the like located thereon.

On the upper surface of the center side member 50 on the left side, the cutout part 54, which is formed lower than the peripheral portions, is provided in the vicinity of the lower side of the doorway 22. A portion on upper side of the cutout part 54 serves as a space through which the ramp 26 is moved. A lower surface of the ramp 26 is located at a position slightly higher than the upper surface of the cutout part 54. In addition, a length of the cutout part 54 in the vehicle front-rear direction is set to be wider than a width of the ramp 26 (a length of the ramp 26 in the vehicle front-rear direction), thereby allowing the ramp 26 to be moved.

The ramp 26 is formed to have a strength which makes the ramp 26 rarely deform upon being installed, even when mounted by a passenger using a wheelchair or by walking, and has a certain weight. Therefore, the housing structure which houses the ramp 26 on the upper side of the low step part 74 of the main battery 70 requires a certain degree of strength. Therefore, in an example shown in FIG. 3, a leading end of the ramp 26 on an outer side of the vehicle located on an upper side of the vicinity of the cutout part 54 upon being housed, and supported by the center side member 50 on the left side. Also in this case, on the vehicle right side, a housing structure which can reliably hold the ramp 26 is required. The housing structure may be constructed, for example, by separately providing cross members for the center side members 50 on both sides. When the low step part 74 of the main battery 70 has sufficient strength, it is also possible to provide the housing structure in such a way as to be supported by the main battery 70. When the housing structure having a high strength can be constructed, the ramp 26 may be housed by moving a leading end of the ramp 26 on an outer side of the vehicle up to an inner side further than the center side member 50 on the left side. In any case, since a large load is exerted on the center side members 50 on both sides, compared with a case in which the ramp 26 is not provided, it is required to ensure a strength the center side members 50.

Figure 4:
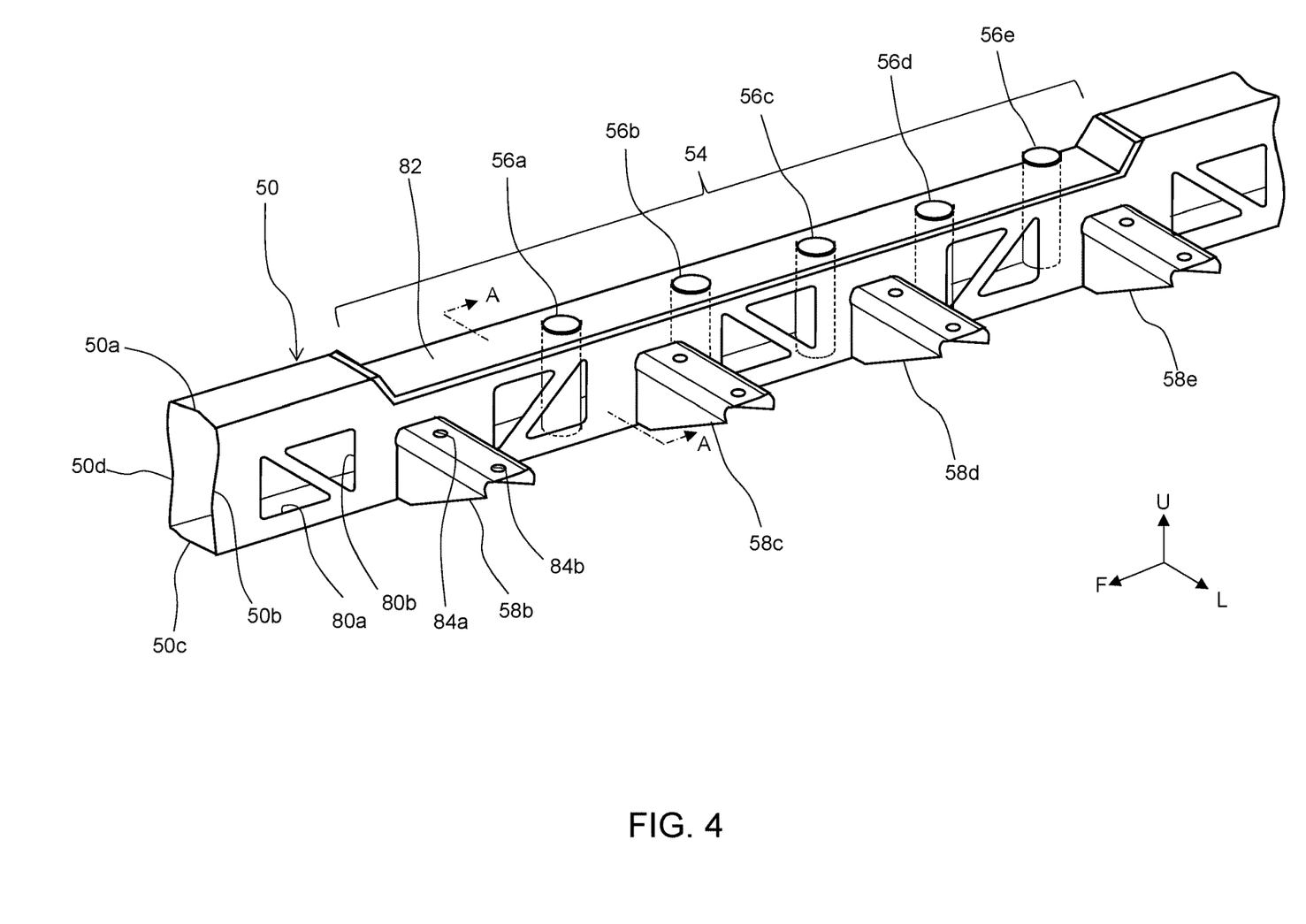
FIG. 4 is a diagram showing a structure in the vicinity of a cutout part of a center side member.

Subsequently, with reference to FIG. 4, details of the cutout part 54 of the center side member 50 on the left side will be described. FIG. 4 shows the vicinity of the cutout part 54 of the center side member 50 on the left side.

The whole periphery of a hollow inside of the center side member 50 thereon is formed in a closed cross sectional shape which is enclosed by an upper wall 50a, a side wall 50b on an outer side in the vehicle width direction, a lower wall 50c, and a side wall 50d on an inner side in the vehicle width direction. Since the closed cross sectional shape enables reduction in weight due to its hollowness and, in addition thereto, exhibits high stiffness in all angular directions, the closed cross sectional shape is adopted for a main structural member of the frame 30. The center side member 50 can be formed in the closed cross sectional shape, for example, by combining two bent steel plates and joining the steel plates by welding or the like.

Note, however, that the side wall 50b of the center side member 50 on the outer side in the vehicle width direction is provided with through-hole sets, each of which is constituted by combining two substantially triangular through holes 80a and 80b, at substantially constant intervals. Although the illustration thereof is omitted, the side wall 50d of the center side member 50 on the inner side in the vehicle width direction is also provided with through-hole sets. The through-hole sets are provided for the purpose of reduction in weight because even when these sets are provided, a strength required of the center side member 50 can be ensured. In the embodiment, since strength can be ensured, each of the side wall 50b and 50d in the vicinity of the cutout part 54 is also provided with through-hole sets.

The cutout part 54 is a portion whose height of the upper wall 50a of the center side member 50 is set to be low, compared with heights of front and rear portions of the center side member 50. The cutout part 54 can be produced in the center side member 50, for example, by combining a steel plate which is pressed into a shape of the upper wall 50a and a steel plate which is pressed into a substantially U-shape constituted of both the side walls 50b and 50d and the lower wall 50c.

Since the upper surface of the cutout part 54 is low, compared with the front and rear portions thereof, a strength of the cutout part 54 is comparatively weak. In addition, as described above, a load for housing and moving the ramp 26 is exerted on the vicinity of the cutout part 54. Therefore, a reinforcing member 82 formed of a thick steel plate is joined onto the upper surface of the cutout part 54 by welding or the like. A depth of a cutout of the cutout part 54 is set such that even when the reinforcing member 82 is provided, the movement of the ramp 26 is not hindered. By providing the reinforcing member 82, the strength of the center side member 50 on the left side in the vicinity of the cutout part 54 can be enhanced.

In the vicinity of the cutout part 54, as described above, the side wall 50b of the center side member 50 on the outer side in the vehicle width direction is provided with the cab mount brackets 58b, 58c, 58d, and 58e that are close together. The cab mount brackets 58b, 58c, 58d, and 58e are attached to the center side member 50, for example, by subjecting a steel plate to press working and thereafter, joining the pressed steel plate thereto by welding. In an upper portion of each of the cab mount brackets 58b, 58c, 58d, and 58e, bolt holes 84a and 84b used for fastening are provided. The upper body can be fastened to the cab mount brackets 58b, 58c, 58d, and 58e, for example, via elastic members such as rubber bushes. Note, however, that it is considered that when the upper body is rigidly joined to the cab mount brackets 58b, 58c, 58d, and 58e, stiffness of the upper body and a strength of the center side member 50 in the cutout part 54 can be further enhanced. Therefore, by using relatively hard elastic members, or without using the elastic members, the upper body may be joined to the cab mount brackets 58b, 58c, 58d, and 58e.

In the cutout part 54, five collars 56a, 56b, 56c, 56d, and 56e are provided. Each of the collars 56a, 56b, 56c, 56d, and 56e is a member formed of metal in a cylindrical shape. Here, the collar 56a is cited as an example, and detailed description will be given with reference to FIG. 5.

Figure 5:
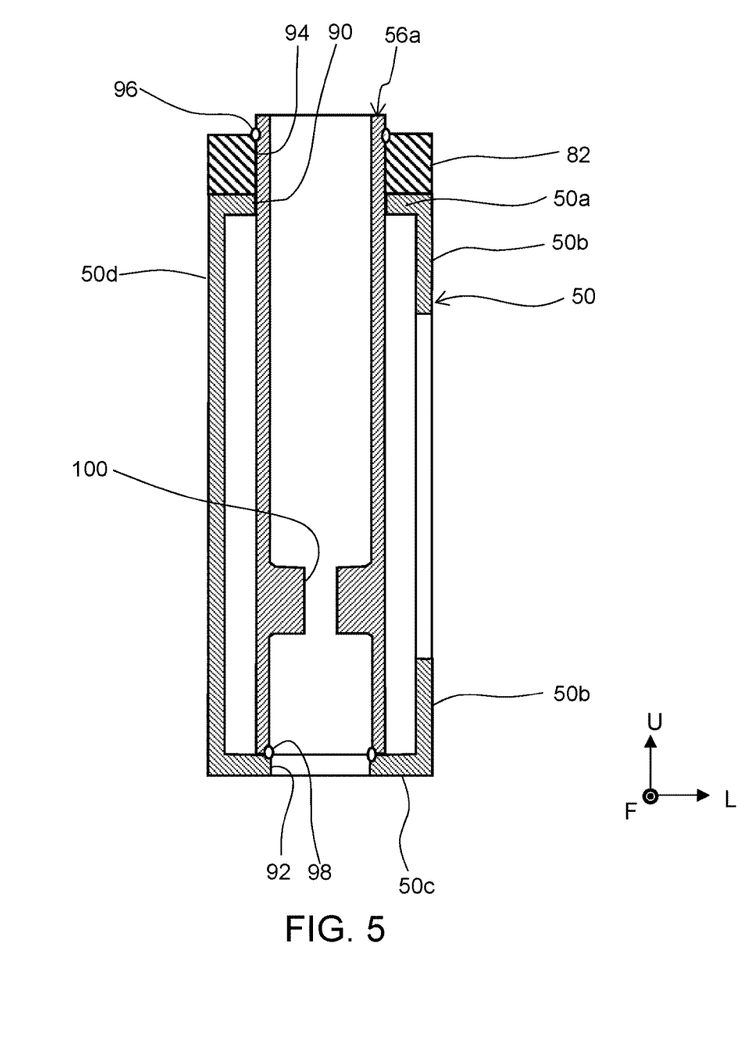
FIG. 5 is a cross sectional view of a center side member and a collar, viewed along line AA in FIG. 4.

FIG. 5 is a cross sectional view, taken along line AA in FIG. 4. In the center side member 50, the upper wall 50a is provided with a circular through-hole 90, the lower wall 50c is provided with a circular through-hole 92 at a position where the through-hole 90 and the through-hole 92 are coaxially arranged. In addition, the reinforcing member 82 joined onto the upper surface of the upper wall 50a is provided with a circular through-hole 94 such that the through-hole 90 of the upper wall 50a and the through-hole 94 are coaxially arranged.

Both of an inner diameter of the through-hole 90 of the upper wall 50a and an inner diameter of the through-hole 94 of the reinforcing member 82 are slightly larger than an outer diameter of the collar 56a. Therefore, the collar 56a is passed from above through the through-holes 94 and 90 and is inserted into an inside of the center side member 50.

On the other hand, an inner diameter of the through-hole 92 of the lower wall 50c is smaller than the outer diameter of the collar 56a and is substantially the same as the inner diameter of the collar 56a. Therefore, a lower end of the collar 56a does not pass through the through-hole 90 and is placed on an upper surface of the lower wall 50c. At this time, an upper end of the collar 56a is in a state of slightly protruding upward from an upper surface of the reinforcing member 82. The depth of the cutout of the cutout part 54 is set such that the protrusion of the upper end of the collar 56a does not hinder the movement of the ramp 26.

The collar 56a, in a vicinity of the upper end thereof, can be fixed onto the reinforcing member 82, for example, by welding an outer peripheral surface of the protruding portion onto the upper surface of the reinforcing member 82. In FIG. 5, a welding bead 96 associated with this welding is illustrated.

In addition, a lower end of the collar 56b is fixed onto the lower wall 50c by welding from an inner peripheral side thereof. In FIG. 5, a welding bead 98 associated with this welding is illustrated. The lower end of the collar 56b is connected to the upper surface of the lower wall 50c, thereby allowing a reinforcing effect of the center side members 50 to be enhanced.

As described above, the collar 56a is laid across not only between the upper wall 50a and the lower wall 50c of the center side members 50 but also to the reinforcing member 82 joined onto the upper surface of the upper wall 50a. Joining the collar 56a with the reinforcing member 82 and the lower wall 50c enhances a strength of the center side member 50 in the vicinity of the cutout part 54.

On a lower surface of the lower wall 50c of the center side member 50, as shown in FIG. 2, the center cross member 52d is fixed by utilizing the collar 56a. This fixation can be conducted, for example, by inserting a bolt into an inside of the collar 56a from an upper end side thereof, passing the center cross member 52d disposed on the lower surface of the lower wall 50c therethrough, and thereafter, fastening the center cross member 52d with a nut provided for the lower surface of the center cross member 52d. A head of a bolt may be located on the upper end of the collar 56a. In this case, the depth of the cutout of the cutout part 54 is set such that the head of the bolt does not hinder the movement of the ramp 26. In the example shown in FIG. 5, inside the collar 56a, a protruding part 100 whose inner diameter is made small is provided. Although an outer diameter of the head of the bolt is smaller than an inner diameter of a general portion of the collar 56a, the outer diameter of the head of the bolt is set to be larger than the inner diameter of the protruding part 100. This allows the center cross member 52d to be fastened without locating the head of the bolt on the upper end of the collar 56a.

When the center cross member 52d is fixed, a large downward load is exerted on the collar 56a via the bolt. However, the collar 56a is joined in a state of being placed on the upper surface of the lower wall 50c. Since the load from the lower end of the collar 56a is transmitted to the upper surface of the lower wall 50c through the boundary area between the collar 56a and the lower wall 50c, the joining portion of the collar 56a and the lower wall 50c can endure the large load.

As described hereinabove, in the present embodiment, in order to allow the ramp 26 to be moved and housed, the cutout part 54 is provided for the center side member 50 located on the lower side of the doorway 22. On the upper surface of the cutout part 54, the reinforcing member 82 which directly reinforces the center side member 50 is provided. In addition, the center side member 50 on the left side is provided with the collars 56a, 56b, 56c, 56d, and 56e, thereby devising the reinforcement of the vicinity of the cutout part 54. The center side member 50 on the right side is provided with the collars 156a, 156b, 156c, 156d, and 156e, thereby devising the reinforcement of the position facing toward the cutout part 54. Since the lower ends of these collars 56a, 56b, 56c, 56d, and 56e and collars 156a, 156b, 156c, 156d, and 156e are joined onto the upper surfaces of the lower walls 50c of the center side members 50, strength properties are high. In addition, by using the collars 56a and 156a, the collars 56b and 156b, the collars 56c and 156c, the collars 56d and 156d, and the collars 56e and 156e, in the vicinity of the cutout part 54, the center cross members 52d, 52e, 52f, 52g, and 52h are densely provided respectively, thereby reinforcing the joining of the left and right center side members 50. The main battery 70 is also likely to be utilized for reinforcement of the strength. The center side members 50 on both sides are also provided with the cab mount brackets 58b, 58c, 58d, and 58e that are close together, thereby devising the enhancement of the strength utilizing the stiffness of the upper body.

Naturally, when all of these configurations are introduced, sufficient strength of the frame 30 is ensured. However, even by introducing only some of these configurations, sufficient strength of the frame 30 could be attained. The extent to which strength is ensured may be determined by taking into consideration the strength which the center side members 50 including the cutout part 54 has, and the strength required to move and house the ramp 26.

The invention claimed is:

1. A vehicle structure comprising:
    side members being provided on both sides under a floor of an electric vehicle, each of the side members being in a closed cross sectional shape;
    collars being provided in such a way as to be laid across an upper wall and a lower wall of each of the side members;
    cross members being fixed on a lower side of the lower wall of each of the side members by using the collars and being laid across the side members on both sides;
    a main battery being provided between the side members on both sides and being supported by the cross members;
    in a vicinity of a lower side of a doorway of the electric vehicle, a cutout part being formed such that a height of a portion of the upper wall of the side member is relatively lowered;
    a reinforcing member being provided on an upper surface of the cutout part; and
    a ramp passing through a space on an upper side of the cutout part and moving to an outside of the vehicle upon being installed, and moving to an upper side of the main battery upon being housed,
    wherein on an outer surface of a side wall of each of the side members on an outer side in a vehicle width direction, a plurality of cab mount brackets for supporting an upper body of the electric vehicle are attached, and
    wherein in a vicinity of the cutout part, an attachment density of the cab mount brackets is increased.

2. The vehicle structure according to claim 1, wherein lower ends of the collars are joined onto an upper surface of the lower wall of each of the side members by welding.

* * * * *